United States Patent
Jiang

(10) Patent No.: US 6,564,375 B1
(45) Date of Patent: May 13, 2003

(54) REUSABLE COMPONENTS FOR CUSTOMIZATION OF WIZARD-BASED APPLICATIONS

(75) Inventor: Yansheng Jiang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/360,070

(22) Filed: Jul. 23, 1999

(51) Int. Cl.⁷ .............................................. G06F 9/44
(52) U.S. Cl. .................... 717/165; 707/103 R; 345/762
(58) Field of Search ............................. 717/10, 1, 162, 717/163–167, 105, 109, 113, 100–102, 104–108, 110–112, 114–119; 345/804, 805, 739, 762, 809, 853, 967–968; 707/103 R, 102, 104.1

(56) References Cited

U.S. PATENT DOCUMENTS

| | | | |
|---|---|---|---|
| 4,821,211 A | * 4/1989 | Torres | 345/853 |
| 4,970,678 A | 11/1990 | Sladowski et al. | 707/531 |
| 5,305,435 A | 4/1994 | Bronson | 345/777 |
| 5,367,635 A | 11/1994 | Bauer et al. | 709/221 |
| 5,500,929 A | 3/1996 | Dickinson | 345/853 |
| 5,561,769 A | 10/1996 | Kumar et al. | 709/202 |
| 5,745,109 A | 4/1998 | Nakano et al. | 345/838 |
| 5,784,001 A | 7/1998 | Deluca et al. | 340/756 |
| 5,832,496 A | * 11/1998 | Anand et al. | 707/102 |
| 5,913,037 A | 6/1999 | Spofford et al. | 709/226 |
| 5,918,016 A | 6/1999 | Brewer et al. | 709/220 |
| 5,924,101 A | * 7/1999 | Bach et al. | 707/103 R |
| 5,958,016 A | 9/1999 | Chang et al. | 709/229 |
| 5,991,534 A | * 11/1999 | Hamilton et al. | 717/111 |
| 6,104,393 A | * 8/2000 | Santos-Gomez | 345/763 |
| 6,128,622 A | * 10/2000 | Bach et al. | 707/103 R |
| 6,188,401 B1 | * 2/2001 | Peyer | 345/805 |
| 6,053,951 A1 | * 4/2001 | McDonald et al. | 717/109 |
| 6,233,726 B1 | * 5/2001 | Bowman et al. | 717/107 |
| 6,237,135 B1 | * 5/2001 | Timbol | 717/107 |
| 6,247,020 B1 | * 6/2001 | Minard | 707/104.1 |
| 6,282,547 B1 | * 8/2001 | Hirsch | 707/102 |

FOREIGN PATENT DOCUMENTS

| | | | |
|---|---|---|---|
| GB | 2 276 520 | 9/1994 | G06F/15/403 |
| WO | 94/29793 | 12/1994 | G06F/9/44 |

* cited by examiner

Primary Examiner—Gregory Morse
Assistant Examiner—Hoang-Vu Antony Nguyen-Ba
(74) Attorney, Agent, or Firm—Thelen Reid & Priest; Marc S. Hanish

(57) ABSTRACT

A method for altering a wizard-based application, which is usually created using an object-oriented language with a base class, includes utilizing one or more alternative base classes, one or more alternative base classes derived from one or more base classes and defining a backbone for integrating a hierarchy window, attribute window, and wizard page window; and linking the hierarchy window, the attribute window, and the wizard page window to a database and to each other so that changes made to one window are reflected in all the others and in the database, and so that selecting a particular wizard page in one window acts to select that same page in the others. This approach allows a software developer to easily create and modify a wizard, and allows an intermediate stage user, such as an Internet Service Provider, to easily modify the wizard to skip pages and enter known data so that the end user need not go through unnecessary steps in the installation wizard when installing a software program.

41 Claims, 7 Drawing Sheets

REUSABLE COMPONENTS FOR CUSTOMIZATION OF WIZARD-BASED APPLICATIONS

BACKGROUND OF THE INVENTION

1. Field of the Invention

The present invention relates to the field of wizard-based applications. More specifically, the present invention relates to the use of reusable components to allow for the easy customization of wizard-based applications.

2. The Background

A Wizard-based application, or "wizard", is an interactive help utility which guides a user through each step of a multi-step operation, offering helpful information and explaining options along the way. Wizards were originally designed by Microsoft® for its Windows® applications, but now are widely imitated and utilized in a wide variety of computer applications.

FIG. 1 is a diagram illustrating a step in a wizard. Dialog box 10 may contain information 12 about the step as well as radio buttons 14. When the user has completed the step, he may select a "next" button 16 to move to the next step. If the user makes a mistake, he may select a "Prev" button 18 to edit the previous step. Cancel 20 and help 22 boxes are also available.

FIG. 2 is a diagram illustrating another step in a wizard. Dialog box 50 contains information 52, radio buttons 54, and a select box 56 where a user may select a file name or browse through his directories to find an appropriate file name. Other types of input fields are also possible, including checkboxes and edit boxes.

Due to the fact that they simplify step-style applications, wizards are most commonly used in installation programs, which facilitate the installation and configuration of computer software or hardware. One specific type of application where they are especially helpful is in the area of communications programs for connection to networks or the Internet. Internet Service Providers (ISPs) are organizations that provide access to the Internet. They commonly offer a multitude of different connection choices, such as dial-up, ISDN, DSL, etc. Many users who utilize ISPs want a simple way to install and/or configure software to utilize their Internet or network connection. As such, many ISPs now offer free software when a user signs up for an account, the software including a wizard to facilitate installation and configuration.

With installation and configuration of communications software, there are a variety of different possible pieces of information that the software may need in order to be installed and configured properly. The end user may need to supply such information as his name, user name, password, whether his phone line requires a "9" to be dialed in order to dial out, etc. The ISP may be able to supply other information before issuing the software to the end user, such as connection type, security information, and domain information.

ISPs however, rarely design the software they distribute. Rather a software developer may design general communications software. The ISP then will generally modify the software to enter the information it has available and to only have the wizard or wizards show the steps to the end user that the end user needs to see. In doing so, the ISP will generally also have to step through the wizard linearly (i.e. from the first step to the last step) and enter whatever information it has available. This wastes time, however, as it will normally have to skip over steps that the end user will have to respond to. If an end user cannot modify a field, the end user will generally not wish to see it. Therefore, ISPs spend considerable time and money modifying the software, especially the wizards, to best suit their customers.

Additionally, different ISPs may require slightly different implementations of the software and could benefit from the software provider giving them exactly the software they need. For example, an ISP that only offers dial-up access would not want software that provides an option for or helps configure an ISDN connection, as it wastes time and money and it ultimately would have to remove that option before giving it to the end users. Software providers, however, do not want to have to design a multitude of versions of the same piece of software in order to appease every ISP. What is needed is a solution which allows both the software provider and the ISP to easily customize wizards for ultimate use by the end users, in a way that is simple to implement in light of current C++ and MFC techniques.

SUMMARY OF THE INVENTION

A method for altering a wizard-based application, which are usually created using an object-oriented language with a base class, comprising utilizing one or more alternative base classes, said one or more alternative base classes derived from said one or more base classes and defining a backbone for integrating a hierarchy window, attribute window, and wizard page window; and linking said hierarchy window, said attribute window, and said wizard page window to a database and to each other such that changes made to one window are reflected in all the others and in said database, and that selecting a particular wizard page in one window acts to select that same page in the others. This allows a software developer to easily create and modify a wizard, as well as providing an intermediate stage user, such as an Internet Service Provider, with the ability to easily modify the wizard to skip pages and enter known data so that the end user need not go through unnecessary steps in the installation wizard when installing a software program. This solution also allows currently developed wizards to be easily modified for use with the present invention by simply changing the class from which each function or procedure is derived and a few other minor additions.

DETAILED DESCRIPTION OF A PREFERRED EMBODIMENT

Figure 1:
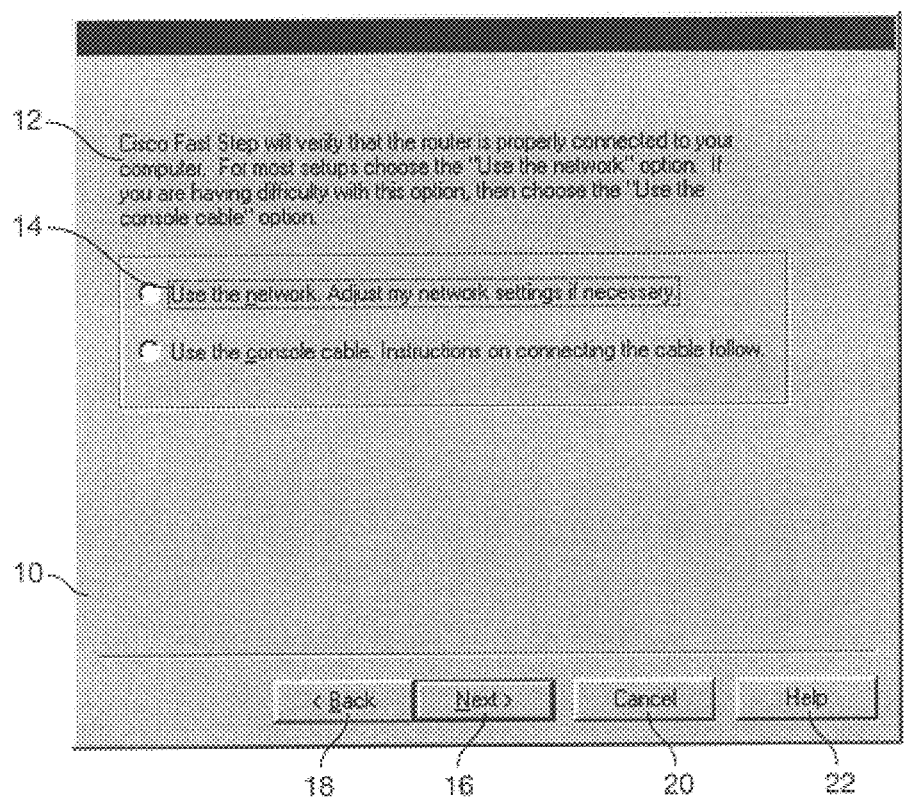
FIG. 1 is diagram illustrating a step in a wizard.
Figure 2:
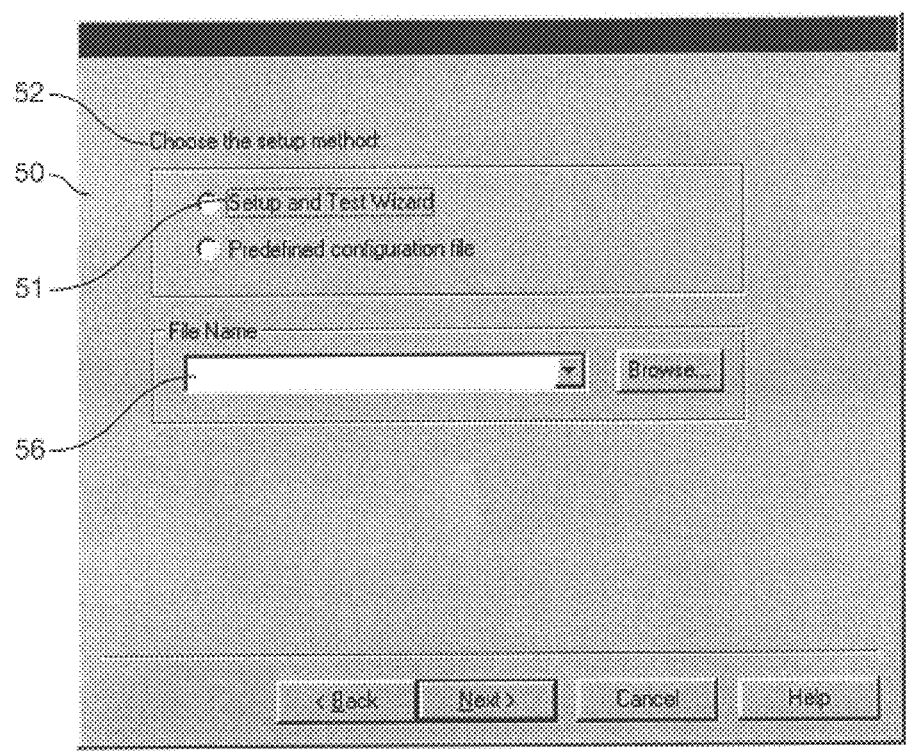
FIG. 2 is a diagram illustrating another step in a wizard.

Those of ordinary skill in the art will realize that the following description of the present invention is illustrative only and not in any way limiting. Other embodiments of the invention will readily suggest themselves to such skilled persons after review of this disclosure.

In accordance with a presently preferred embodiment of the present invention, the components, processes and/or data structures are implemented using C++ and Microsoft® Foundation Class. Different implementations may be used and may include other types of programming languages, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

Throughout this application, the terms "user" and "end user" are used. These are intended to represent two different entities. For purposes of this application, a "user" is the person or entity running the present invention (i.e. using the present invention to aid in the modification of a wizard), while an "end user" is the person or entity who will eventually run the wizard itself. In the context of Internet communications, the "user" will likely be either the wizard software designer or an ISP, while the "end user" will likely be one of the ISP's customers.

The Microsoft® Foundation Class Library (MFC) is a collection of classes that can be used in building application programs, specifically building application programs for the Windows® line of operating systems. The classes in MFC are written in the C++ programming language. MFC allows a programmer to save time by providing pre-defined classes, and thus an overall framework, which a programmer may easily use in constructing the application. There are MFC classes for all graphical user interface elements (windows, frames, menus, toolbars, status bars, etc.), for building interfaces to databases, for handling events such as messages from other applications, for handling keyboard and mouse input, and for other Windows events.

A dialog is provided by MFC for permitting a programmer to modify the values for a group of properties. In a wizard application, this dialog is known as a property page. With a complicated control, several property pages may need to be used, with a group of related properties being assigned to each page. A series of property pages such as this may be organized and associated with a property sheet, which has the appearance of a tabbed dialog box. In MFC, the class CPropertySheet defines a property sheet and the base class called CPropertyPage is used to define individual tabbed pages within a property sheet. Each property page may have such controls as edit boxes, list boxes, or radio buttons, for the setting of individual property values. Thus, CPropertyPage is commonly used in creating wizards, and each property page normally represents a page in the wizards, with a property sheet defining a category of property pages.

Figure 3:
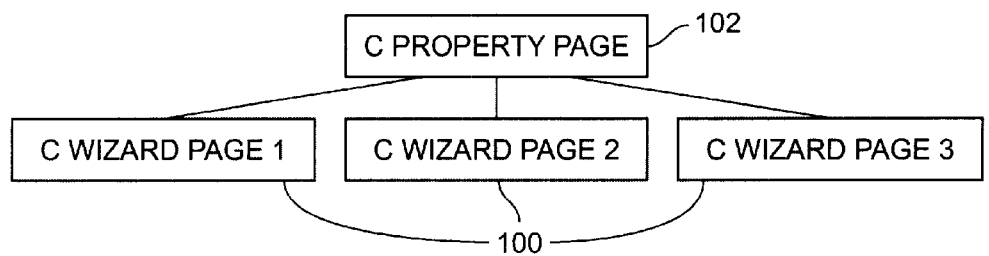
FIG. 3 is a block diagram illustrating a typical organization of property page class and functions for a wizard.

Typically, in creating wizards, the programmer will create several functions using the CPropertyPage as the base class. Normally, a different function will be created for each step of the wizard, such as CWizardPage1, CWizardPage2, etc. Within each of these functions, the base class CPropertyPage is referenced. FIG. 3 is a block diagram illustrating the organization of the property page class and functions. Functions 100 relate to base class CPropertyPage 102.

Figure 4:
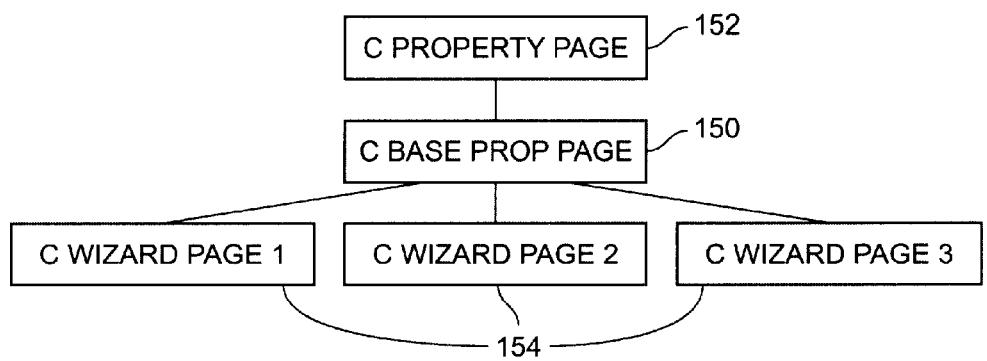
FIG. 4 is a block diagram illustrating an organization of property page class and functions for a wizard according to a presently preferred embodiment of the present invention.

FIG. 4 is a block diagram of the organization of the property page class and functions according to a presently preferred embodiment of the present invention. A new class, CBasePropPage 150, is a class derived from CPropertyPage 152. All functions 154 are then derived directly from CBasePropPage 150 rather than from CPropetyPage152. In order to accomplish this, developers need simply replace the base class from CPropertyPage to CBasePropPage when creating functions. CBasePropPage introduces several new states and defines many interfaces and behaviors.

One new state that is introduced is a link to a database source (m_pDB). This links a wizard page with an external database source. Another new state is a link to an attribute window (m_hwndAttrWnd). The attribute window will be described in more detail below. Boolean values (m_bShouldSkip, m_bVisited) are defined in CBasePropPage as well, as is a link to the parent container class (M_PTheSheet).

New functions may also be defined in CBasePropPage. One of these functions may be SetShouldSkip (for setting when a page should be skipped). Customized windows user message handlers may be defined as well. OnChangeAttrEditable sets the editable attribute for a specific control when a message is received (the message is generated when a user toggles an editable check box in the attribute window). OnChangeAttrDisplayable does the same for the displayable attribute.

Additionally, certain functions of CPropertyPage may be overridden. OnSetActive now allows the CBasePropPage to call the property sheet object (m_pTheSheet) to update the "Prev" and "Next" button states as part of the synchronization feature. If this page should be skipped, it returns FALSE, otherwise, two windows user messages are sent to the attribute window and the new page's database table name and page title are passed. As a result, the attribute window will refresh itself to load this new page's attributes from the database. This is also part of the synchronization feature. It also temporarily marks the visited flag as TRUE, and sends a user message to the skip window to reflect the change. Finally, it will open the database table and initialize the controls for this wizard page.

OninitDialog now allows CBasePropPage to call a function called UpdateControlsfromDB to initialize its controls from the database. This is part of the customization process wherein a wizard page will initialize its controls based on predefined settings in a database, created by an ISP. OnWizardNext now causes CBasePropPage to call a function named CanSkip to test if this page is skippable. If the test fails, a message box will pop up and the page will not be allowed to advance. Otherwise, CBasePropPage will send a user message to the attribute window and set the visited flag to TRUE permanently in the database. OnWizardBack now causes CBasePropPage to consult with the database to see whether the visited flag should be TRUE or not. The reason for this is that when a user first enters a new page, the visited flag is temporarily set as TRUE. If the user successfully advances to the next page, the previous page is permanently set to TRUE. Another case is when the user enters a page and clicks on the skip check box in the Skip Window. If skipping is allowed, then this page will be marked as Visited Permanently.

Figure 5:
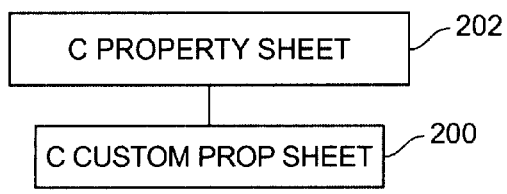
FIG. 5 is a block diagram illustrating a typical organization of property sheet class and functions for a wizard.

Typically, in creating wizards, the programmer will create a custom property sheet using CPropertySheet as the base class. Normally, a different sheet will be created for each wizard, such as CCustomPropSheet. Within this sheet the base class CPropertySheet is referenced. FIG. 5 is a block diagram illustrating this organization of the property sheet class and functions. Sheet 200 relates to base class CPropertySheet 202.

Figure 6:
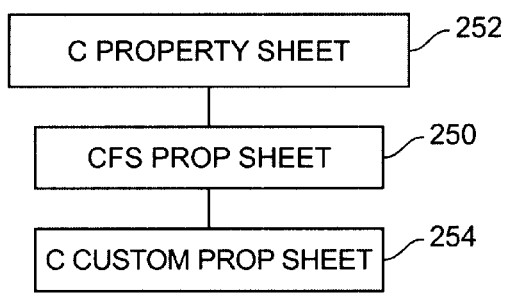
FIG. 6 is a block diagram illustrating an organization of property sheet class and functions for a wizard according to a presently preferred embodiment of the present invention.

FIG. 6 is a block diagram of the organization of the property sheet class and functions according to a presently preferred embodiment of the present invention. A new class, CFSPropSheet 250, is a class derived from CPropertySheet 252. Sheet 254 then is derived directly from CFSPropSheet 250 rather than from CPropetySheet 252 In order to accomplish this, developers need simply replace the base class from CPropertySheet to CFSPropSheet when creating sheets. CFSPropSheet introduces several new states and defines many interfaces and behaviors.

One new state that is introduced is a link to a database source (m_pDB). This links a wizard page with an external database source. Another new state is a link to an attribute window (m_hwndAttrWnd). The attribute window will be described in more detail below.

New functions may also be defined in CFSPropSheet. SetPrevNextBtns sets the correct state (enable/disable) for "prev" and "next" buttons. Since the CFSPropSheet knows each page's skip status, it can set Prev and next states at run-time to reflect the correct logic. For example, if page 1 and page 2 are both marked as "skipped", when page 3 is the current page, then the "prev" button will be disabled. GetpropPage translates a dialog ID to a pointer to CBasePropPage. Dialog IDs are stored in the database and used by the attribute window and hierarchy window to identify wizard pages.

Additionally, CFSPropSheet overrides certain functions of CPropertySheet. CFSPropSheet::AddPageo( ), besides calling the base class CPropertySheet's AddPageo( ), now calls SetPropSheet of each CBasePropPage being added, and passes the pointer to the current property sheet to the property page being added. It also calls SetDB and passes a point to the database to the property page being added. Lastly, it calls SetAttrWnd and passes the attribute window handle to the property page being added. With this function, now every property page will be initialized with additional information.

DoModal now loops through a list of property pages and finds the first page which is not skippable. If this page is not the natural first page, it will set it to the first page visible. then it will create the wizard by calling the base class's DoModal. With this function, now an application will automatically determine which page should be displayed according to the "skip" attribute set by the user.

WindowProc adds message handling routines for three component-specific user messages: WM_FS_CHG_SKP_DLG, WM_FS_QUERY_CANSKIP, and WM_FS_GOTO_PAGE (which are discussed in more detail below).

Additional classes may be created to define how an attribute window, hierarchy window, and wizard page window are integrated with the database and the user interface. in order to implement this, each function created by the software developer may contain an object linking to these windows. Each of these windows will be discussed in detail below.

There are several user-defined windows messages which may be utilized in a preferred embodiment of the present invention. These messages are sent from component to component (e.g. hierarchy window to attribute window). These include:

WM_FS_SET_HWND—For allowing each property page or dialog box to send its attribute table name and its title to the attribute window for processing and display.

WM_FS_CHG_EDITABLE—For allowing the attribute window to notify the current Wizard page each time the user toggles an editable field value. Upon receipt of such a message, the page will alter the editable attribute of the specific control.

WM_FS_CHG_DISPLAYABLE—For allowing the attribute window to notify the current Wizard page each time the user toggles a displayable field value. Upon receipt of such a message, the page will alter the displayable attribute of the specific control.

WM_FS_CHG_SKIP_DLG—For allowing the attribute window to notify the current Wizard page to change the skip status for a specific page.

WM_FS_SEL_TREEITEM—For selecting a specific tree node as the user presses "Prev" or "Next" in the current Wizard Page, which sends a refresh message to the attribute window, which then sends this message to the hierarchy window.

WM_FS_CHG_TREE_STATEICON—for controlling the enable/disable state of a tree node icon. When a Wizard page is being visited for the first time, this page is marked temporarily as "Visited". This will be reflected in the appearance of the icon associated with the tree node. Upon entering this page, this message will be sent to the hierarchy window to change the icon from "disabled" to "enabled".

WM_FS_CHG_TREE_STATEICON2—for relaying the WM_FS_CHG_TREE_STATEICON message to the hierarchy window.

WM_FS_CHG_VISITED_FLAG—for modifying the "visited" flag for the current Wizard page.

WM_USER_DLGTBL—for passing the current dialog's attribute table name and title to the attribute window.

WM_FS_QUERY_CANSKIP—for querying whether the current dialog allows skipping.

WM_FS_QUERY_VISITED_FLAG—for querying the visited flag in the database for the current page.

WM_FS_GOTO_PAGE—for allowing a user to click a "Go to page" button in the hierarchy window and directly access any page in the wizard.

Figure 7:
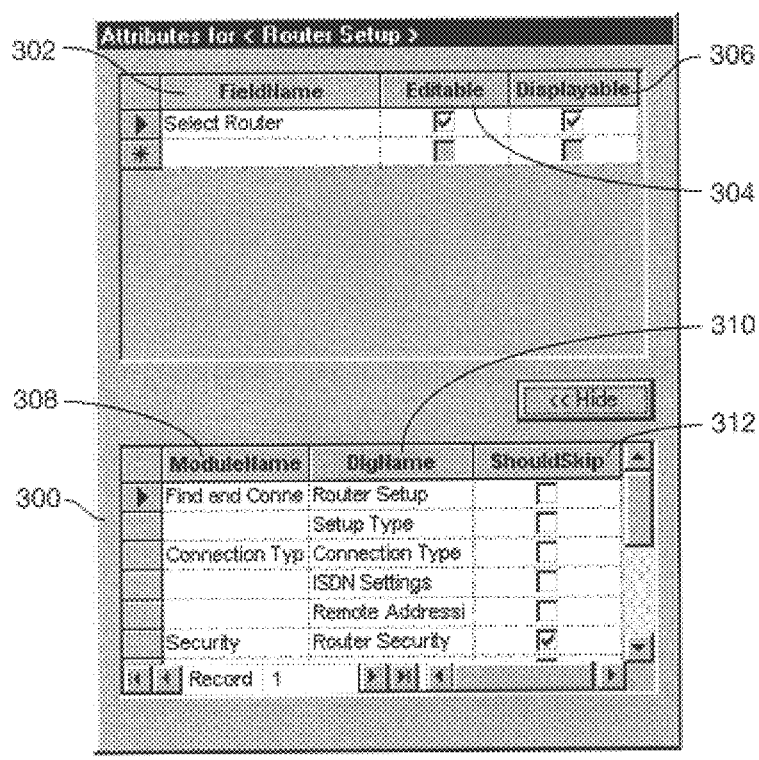
FIG. 7 is a diagram illustrating an attribute window according to a presently preferred embodiment of the present invention.

FIG. 7 is a diagram illustrating an attribute window according to a presently preferred embodiment of the present invention. The attribute window 300 may be used to display and modify attributes for controls in the current property page. It may actually be divided into two graphical user interfaces (GUIs), a top and bottom. On the top, the attribute window 300 has three main columns: field name 302, editable 304, and displayable 306. The field name 302 indicates the name of the field or control in the current property page. Editable 304 indicates whether the control is read-only or read-writeable. Displayable 306 indicates whether the control is visible to the end user. An editable control must be displayable as well, but a displayable control need not be editable. The latter may be used when the software developer or ISP wants the end user to see a particular field (and the settings that were entered for it), but not to be able to change it.

Additional fields may also be provided in the attribute window 300 in the bottom graphical user interface. These additional attributes may be hidden from the ISP unless a button is clicked, as these attributes are usually read-only, not relevant to end users, or can only be modified in source code, and thus are more likely to be modified by a software developer. This bottom GUI performs the preprocessing of database information and displays it in an organized hierarchical table fashion in the hierarchy window. It also handles the interaction between the user interface and the database for skipping attributes. Thus, the additional fields are ModuleName 308, DlgName 310, and ShouldSkip 312. ModuleName 308 indicates the name of the possible modules. The Module Name 308 is normally utilized as a category for the wizard pages, so that each wizard page can be grouped with other wizard pages to make organization and modification a little simpler. DlgName 310 indicates the name of the various dialogs available within each module (property pages). For purposes of the present invention, the dialog name is the name of each wizard page. Shouldskip 312 indicates whether or not each dialog (property page) should be skipped or not. If ShouldSkip 312 indicates that the dialog (property page) should be skipped, then the ISP or end user will not see the dialog (property page) at all. The bottom GUI may populate a tree-like table directly from the interface, which it then may use in generating the hierarchy window. As such, the hierarchy window may often serve as a front end to the bottom GUI, and thus the bottom GUI is often hidden when the hierarchy window is used. To that end, several hidden fields may be used, including DlgID (a unique identifier for each dialog), DlgThlName (each wizard page has a table in the database, this attribute represents the name of the table for this dialog), Visited (marks the page as visited or not), OrderinModule (the place in the module in which the dialog should appear), and ModuleID (uniquely identify a module and its position relative to other modules).

Figure 8:
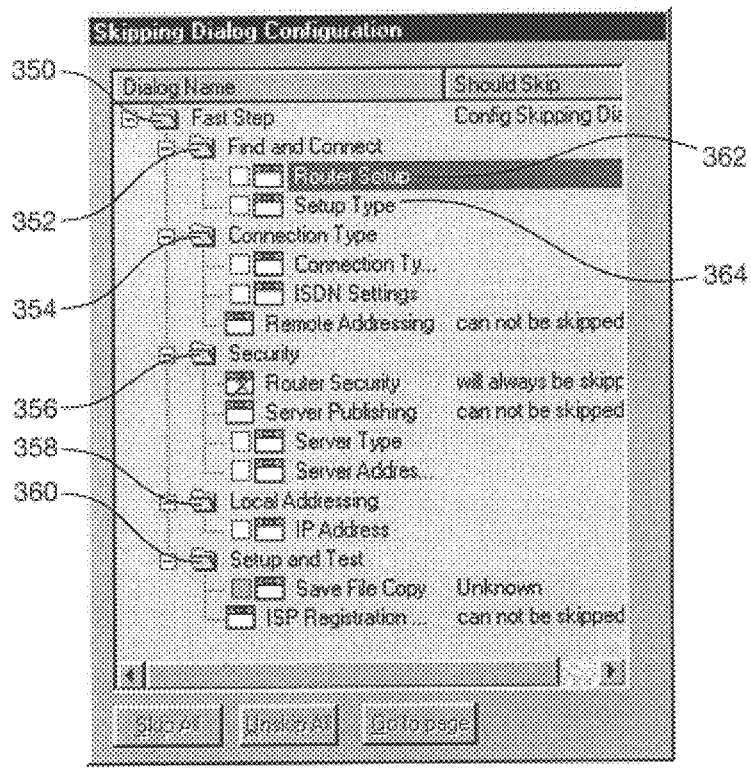
FIG. 8 is a diagram illustrating a hierarchy window according to a presently preferred embodiment of the present invention.

FIG. 8 is a diagram illustrating a hierarchy window according to a presently preferred embodiment of the present invention. The hierarchy window may be used to display the hierarchy of the property pages of the wizard, along with the fields contained on each of those pages. In the diagram, the wizard named fast step (the root folder is "Fast Step" 350) contains 5 modules ("Find and Connect" 352, "Connection Type" 354, "Security" 356, "Local Addressing" 358, and "Setup and Test" 360). Each of these modules then may contain one or more property pages such as a "Router Setup" page 362 and Setup type 364. Each property page may then contain one or more fields (generally the fields used to enter input).

In a presently preferred embodiment of the present invention, the hierarchy window, the attribute window, and a wizard page window are all displayed on a computer screen at the same time. The wizard page window is simply a window displaying the currently selected page of the wizard (as an end user would view it). These windows are linked through the class structure and to the common database, so that each window is synchronized with the others. Therefore, if the user changes a setting in one of the windows, the other windows will reflect that change immediately.

Figure 9:
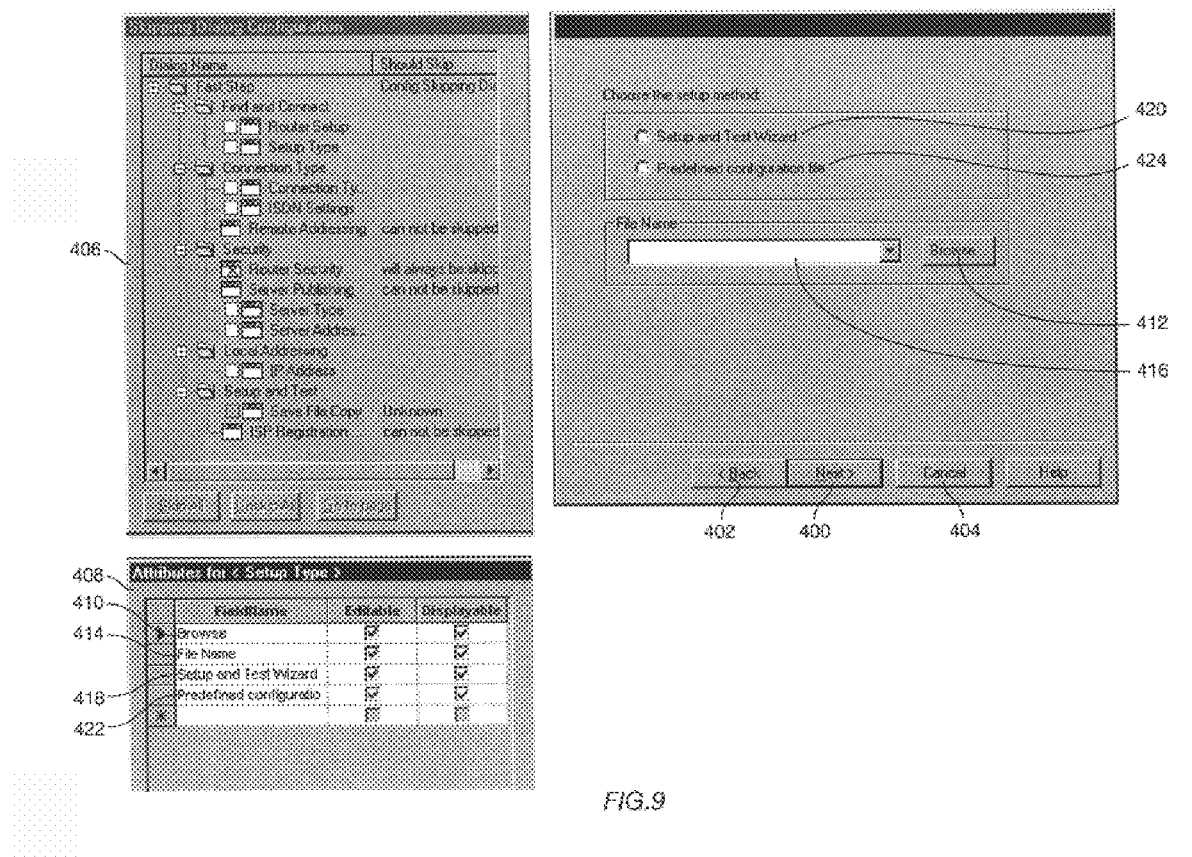
FIG. 9 is a diagram illustrating a synchronized attribute window, hierarchy window, and wizard page window according to a presently preferred embodiment of the present invention.

FIG. 9 is a diagram illustrating a synchronized attribute window, hierarchy window, and wizard page window according to a presently preferred embodiment of the present invention. The user may navigate to different pages in the wizard in one of two ways. Either the user may step linearly through the wizard by clicking the next 400 or back 402 buttons in the wizard page window 404. Each time this is done, the hierarchy window 406 and the attribute window 408 will be changed accordingly to reflect the change to the new page.

The other way the user may navigate is to select the exact page from the hierarchy window (preferably by using a mouse or other input device to select one of the pages in the hierarchy). This allows the user to navigate non-linearly, which is a substantial improvement, especially when dealing with large wizards that have many pages.

The attribute window 408 then displays the fields available on the property page being viewed. In the example in FIG. 9, there are four fields: browse 410 (corresponding to browse button 412), file name 414 (corresponding to file name drag down menu 416), setup and test wizard 418 (corresponding to Setup and Test Wizard button 420), and predefined configuration 422 (corresponding to Predefined Configuration file button 424). As described earlier, these fields may then be modified by changing the attributes (even the hidden attributes). This is also synchronized with the other windows. For example, if the user un-checks the editable attribute of the predefined configuration 422 field, then the corresponding Predefined configuration file button 424 in the wizard page window will be grayed out so that an end user cannot change it (although they would still be able to see it). The user may enter the value that he wants in the field in the wizard page window before he then marks the field as non-editable or non-displayable. This allows a user to easily configure the settings that he wishes, and then lock the end user out from editing and/or viewing the settings. The field or page itself may also be marked as skipped, so that it does not even show up in the wizard at all. Of course, some fields cannot be skipped without setting some value for them, in which case an error message may be displayed to the user indicating that the field or page cannot be skipped without entering a value.

This solution is of great benefit to ISPs, as they can non-linearly move to exact pages that they wish to "edit" out, enter the necessary information in those pages, then block the end-user from editing and/or viewing them. This solution also allows software developers to develop a single wizard for many different ISPs and simply use the present invention to easily modify the wizard for use by individual ISPs (by, for example, marking certain unnecessary property pages as skipped).

Figure 10:
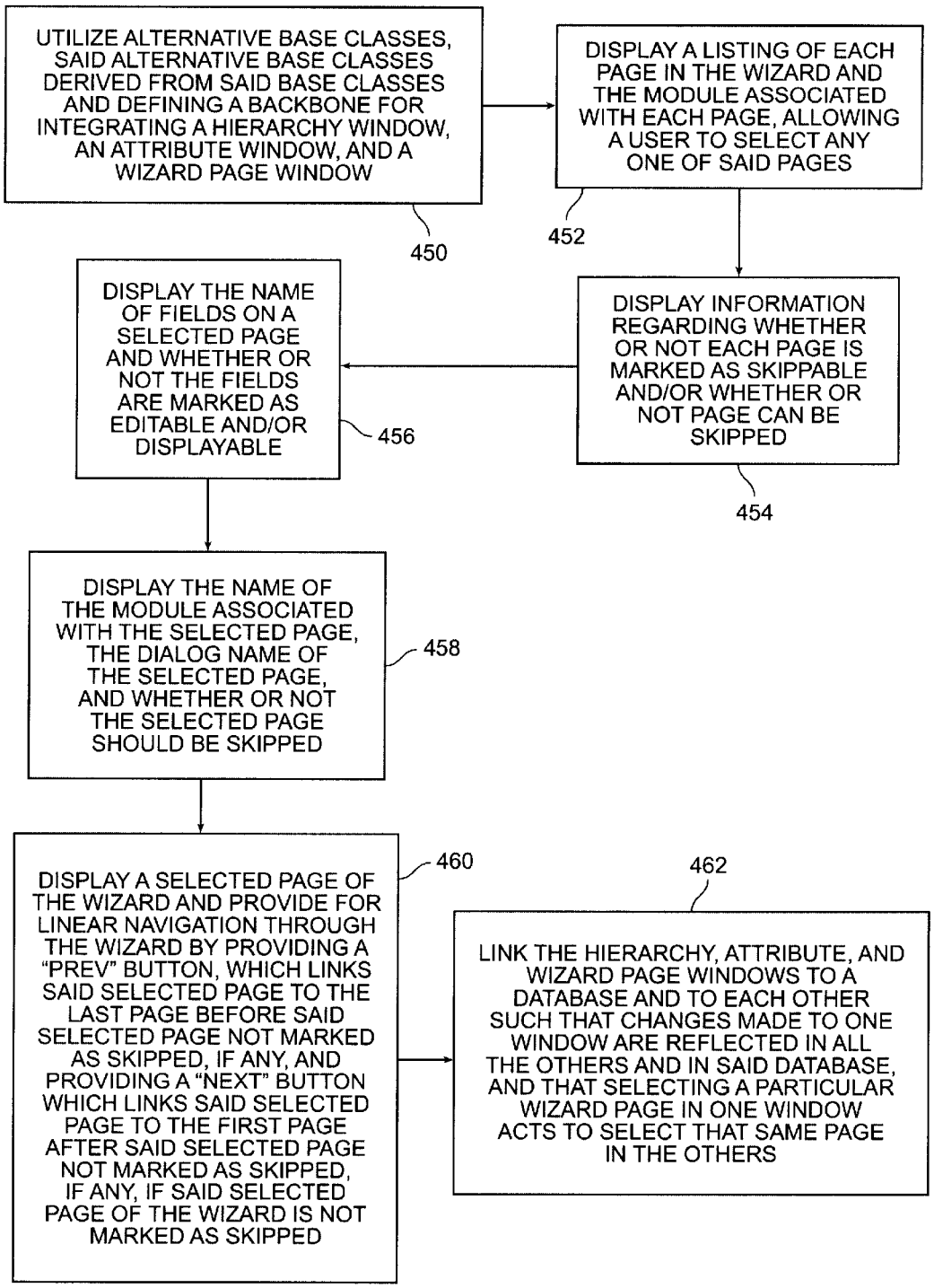
FIG. 10 is a flow diagram illustrating a method for altering a wizard for communications-based software, the wizard created using a base class, according to a presently preferred embodiment of the present invention.

FIG. 10 is a flow diagram illustrating a method for altering a wizard for communications-based software, the wizard created using a base class, according to a presently preferred embodiment of the present invention. At 450, one or more alternative base classes are used, said alternative base classes derived from said base classes and defining a backbone for integrating a hierarchy window, an attribute window, and a wizard page window. This step may be performed by either a software developer in originally designing the wizard, or by an Internet Service Provider in entering data into and modifying the wizard for eventual use by an end user. At 452, the hierarchy window may display a listing of each page in the wizard and the module associated with each page, said hierarchy window additionally allowing a user to select any one of the said pages. At 454, the hierarchy window may display information regarding whether or not each page is marked as skipped and/or whether or not each page can be skipped.

At 456, the attribute window may display the name of fields on a selected page and whether or not the fields are marked as editable and/or displayable. At 458, the attribute window may further display the name of the module associated with the selected page, the dialog name of the selected page, and whether or not the selected page should be skipped. At 460, the wizard page window may display a selected page of the wizard and provide for linear navigation through the wizard. This includes checking if a selected page of the wizard is marked as skipped, and if it is not, displaying it. A "prev" button linking to the last page before the selected page which is not marked as skipped is provided. If no such page exists, no "prev" button is provided. Similarly, a "next" button is provided linking to the next page after the selected page which is not marked as skipped, if any. At 462, the hierarchy window, attribute window, and wizard page window may be linked to a database and to each other such that changes made to one window are reflected in all the others and in said database, and that selecting a particular wizard page in one window acts to select that same page in the others.

Figure 11:
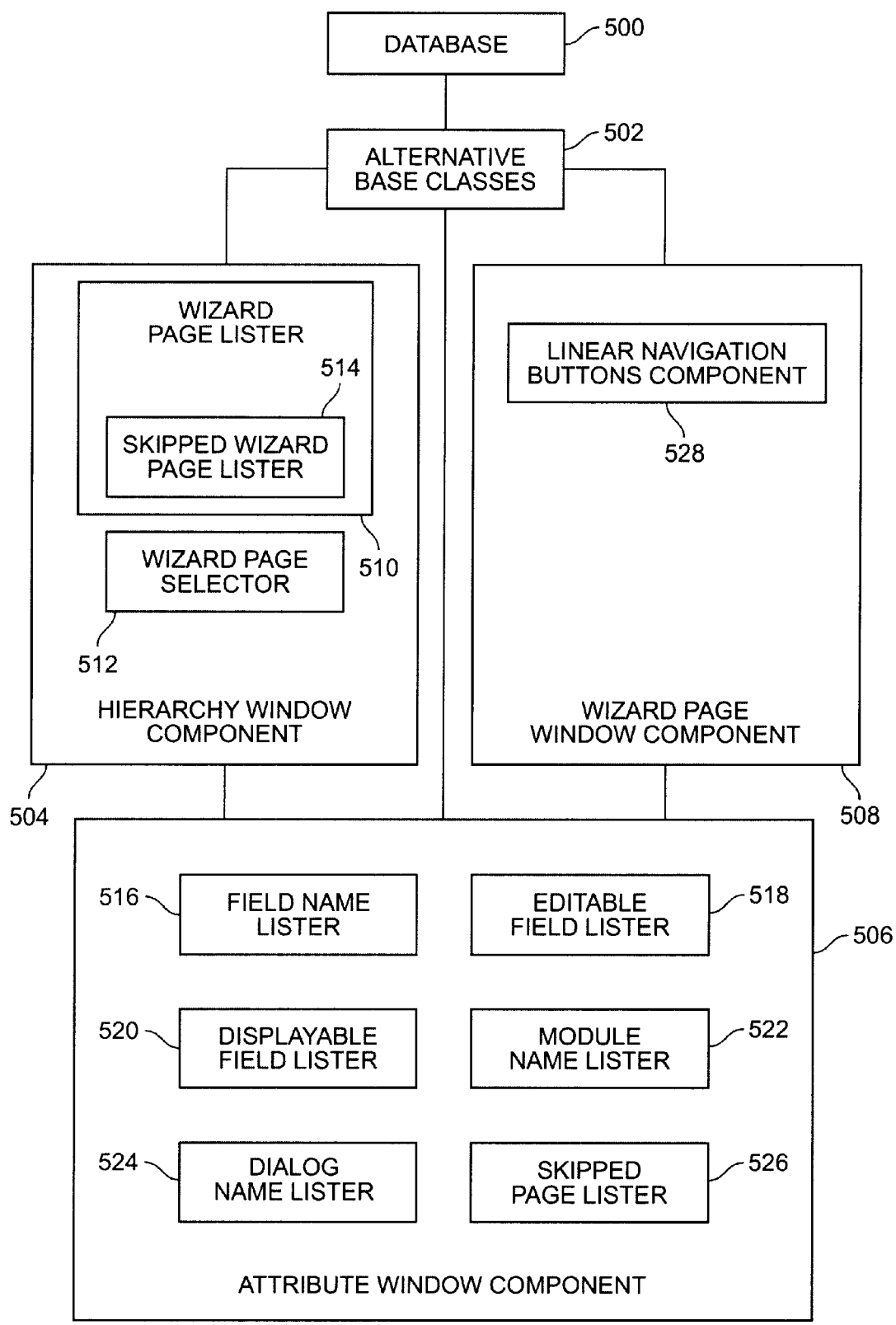
FIG. 11 is a block diagram illustrating a software program for altering a wizard for communications-based software, the wizard created using a base class, according to a presently preferred embodiment of the present invention.

FIG. 11 is a block diagram illustrating a software program for altering a wizard for communications-based software, the wizard created using a base class, according to a presently preferred embodiment of the present invention. A database 500 is provided for storing the information on the wizard and the data stored within the wizard. An alternative base class 502 is coupled to said database, said alternative base class derived from said base class and defining a backbone for integrating a hierarchy window component 504, an attribute window component 506, and a wizard page window component 508. A wizard page lister 510 may be included in said hierarchy window component 504 to allow the hierarchy window to display a listing of each page in the wizard and the module they are classified under. A wizard page selector 512 may also be included in said hierarchy window component 504 to allow said hierarchy window to allow a user to select any one of the said pages. A skipped wizard page lister 514 may be included in said wizard page lister 510 to allow the wizard page lister 510 to have the hierarchy window display information regarding whether or not each page is marked as skipped and/or whether or not each page can be skipped.

A field name lister 516 may be included in said attribute window component 506 to allow the attribute window to display the name of fields on a selected page. An editable field lister 518 may be included in said attribute window component 506 to allow the attribute window to display whether or not the fields are marked as editable. A displayable field lister 520 may be included in said attribute window component 506 to allow the attribute window to display whether or not the fields are marked as displayable. A module name lister 522 may be included in said attribute window component 506 to allow the attribute window to display the name of the module associated with the selected page. A dialog name lister 524 may be included in said attribute window component 506 to allow the attribute window to display the dialog name of the selected page. A skipped page lister 526 may be included in said attribute window component 506 to allow the attribute window to display whether or not the selected page should be skipped.

A linear navigation buttons component 528 may be included in said wizard page window component 508 to provide for linear navigation through the wizard. A "prev" button linking to the last page before the selected page which is not marked as skipped is provided. If no such page exists, a "prev" button may still be provided, but it will be disabled. Similarly, a "next" button is provided linking to the next page after the selected page which is not marked as skipped, if any. Said hierarchy window component 504, said attribute window component 506 and said wizard page widow component 508 may be coupled to said database 500 and to each other such that changes made to one window are reflected in all the others and in said database 500, and that selecting a particular wizard page in one window acts to select that same page in the others.

Figure 12:
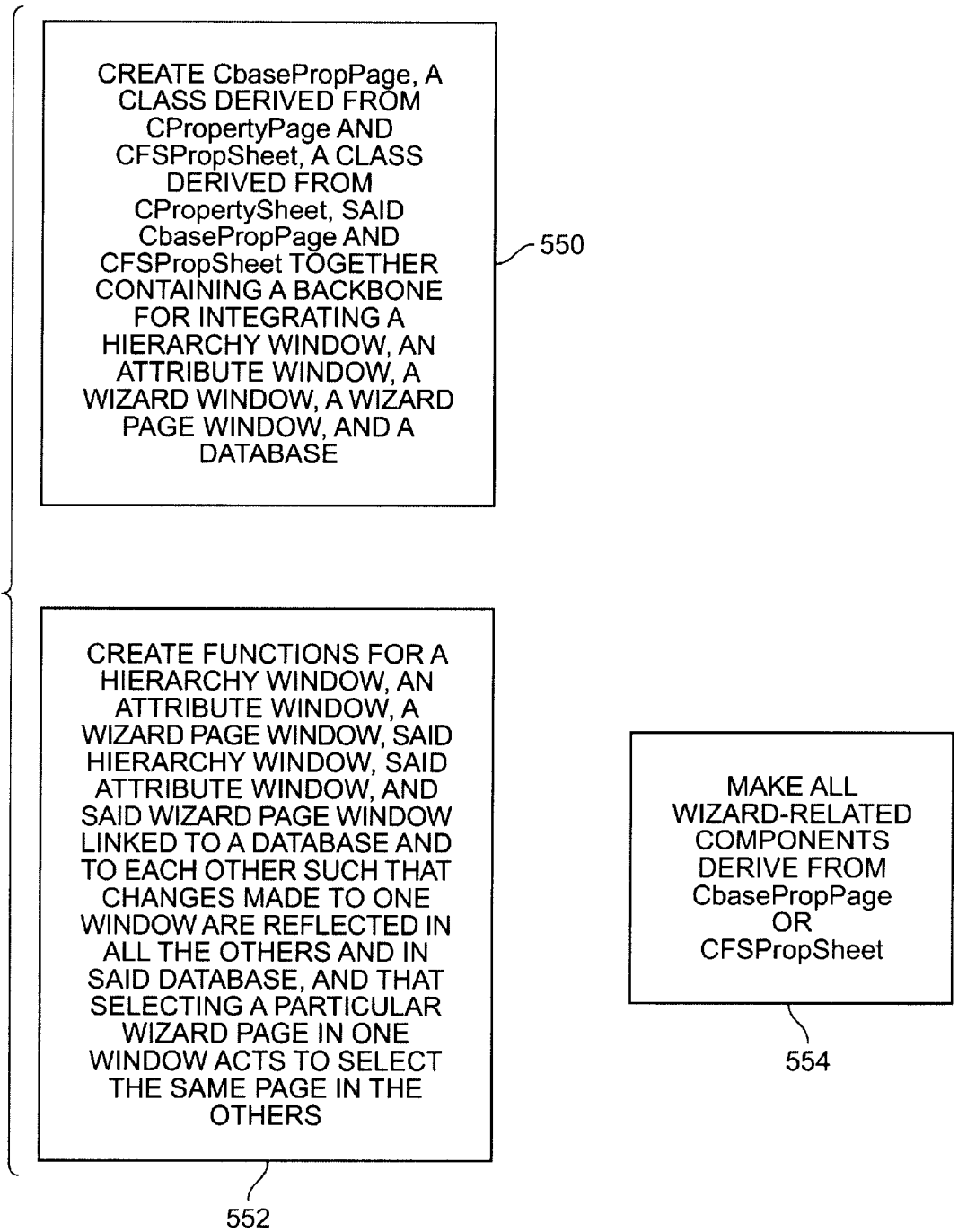
FIG. 12 is a flow diagram illustrating a method for designing a wizard-altering program using C++ and Microsoft® Foundation Class, Microsoft® Foundation Class providing a CPropertyPage class for defining individual pages of a wizard, according to a presently preferred embodiment of the present invention.

FIG. 12 is a flow diagram illustrating a method for designing a wizard-altering program using C++ and Microsoft® Foundation Class, Microsoft® Foundation Class providing a CPropertyPage class for defining individual pages of a wizard, according to a presently preferred embodiment of the present invention. At 550, a CBasePropPage class is created, derived from CPropertyPage, and a CFSPropSheet, derived from CPropertySheet, said CBasePropPage and CFSPropSheet together containing a backbone for integrating a hierarchy window, an attribute window, a wizard page window, and a database. At 552, functions are created for said hierarchy window, said attribute window, and said wizard page window, said hierarchy window, said attribute window, and said wizard page window linked to a database and to each other such that changes made to one window are reflected in all the others and in said database, and that selecting a particular wizard page in one window acts to select that same page in the others. At 554, all wizard-related components derived from CPropertyPage or CPropertySheet are made to derive from CBasePropPage and CFSPropSheet (respectively) instead.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for altering a wizard, the wizard created using one or more base classes, the method including:
   utilizing one or more alternative base classes, said one or more alternative base classes derived from said one or more base classes and defining a backbone for integrating a hierarchy window, attribute window, and wizard page window;
   linking said hierarchy window, said attribute window, and said wizard page window to a database and to each other such that changes made to one window are reflected in all the others and in said database, and that selecting a particular wizard page in one window acts to select that same page in the others; and
   editing said hierarchy window or said attribute window to alter the wizard page window, said wizard page window hiding pages marked as skipped.

2. The method of claim 1, further including:
   displaying a list of pages in the wizard in said hierarchy window along with each page's associated module in a hierarchical format; and
   allowing a user to select any one of said pages in said hierarchy window.

3. The method of claim 2, further including:
displaying information regarding whether or not each page is marked as skipped and/or whether or not each page can be skipped in said hierarchy window.

4. The method of claim 1, further including displaying the name of one or more fields on a selected page and whether or not the one or more fields are marked as editable and/or displayable in said attribute window.

5. The method of claim 4, further including displaying the name of a module associated with said selected page, a dialog name of said selected page, and whether or not said selected page should be skipped in said attribute window.

6. The method of claim 1, further including checking if a selected page of the wizard is marked as "skipped" and if it is not, displaying said selected page of the wizard and providing for linear navigation in said wizard page window by providing a "prev" button which links said selected page to the last page before said selected page not marked as skipped, if any, and providing a "next" button which links said selected page to the first page after said selected page not marked as skipped, if any.

7. A method for altering a wizard for communications-based software, the wizard cleated using a base class, the method including:
utilizing an alternative base class, said alternative base class derived from said base class and having functions for displaying a hierarchy window, an attribute window, and a wizard page window;
linking said hierarchy window, said attribute window, and said wizard page window to a database and to each other such that changes made to one window are reflected in all the others and in said database, and that selecting a particular wizard page in one window acts to select that same page in the others; and
editing said hierarchy window or said attribute window to alter the wizard page window, said wizard pace window hiding pages marked as skipped.

8. The method of claim 7, wherein said utilizing and linking are performed by a software developer.

9. The method of claim 8, wherein an Internet Service Provider utilizes said hierarchy window, said attribute window, and said wizard page window in entering data into and modifying said wizard for eventual use by an end user.

10. The method of claim 7, further including:
displaying a list of pages in the wizard in said hierarchy window along with each page's associated module in a hierarchical format; and
allowing a user to select any one of said pages in said hierarchy window.

11. The method of claim 10, further including:
displaying information regarding whether or not each page is marked as skipped and/or whether or not each page can be skipped in said hierarchy window.

12. The method of claim 7, further including displaying the name of one or more fields on a selected page and whether or not the one or more fields are marked as editable and/or displayable in said attribute window.

13. The method of claim 12, further including displaying the name of a module associated with said selected page, a dialog name of said selected page, and whether or not said selected page should be skipped in said attribute window.

14. The method of claim 7, further including checking if a selected page of the wizard is marked as "skipped" and if it is not, displaying said selected page of the wizard and providing for linear navigation in said wizard page window by providing a "prev" button which links said selected page to the last page before said selected page not marked as skipped, if any, and providing a "next" button which links said selected page to the first page after said selected page not marked as skipped, if any.

15. A method for altering a wizard, the wizard created using at least two base classes, a property sheet base class and a property page base class, and having a property sheet, said property sheet having one or more property pages, each property page representing a page in the wizard and having one or more fields, the method including:
utilizing an alternative property sheet base class, said alternative property sheet base class derived from said property sheet base class and an alternative property page class, said alternative property page base class derived from said property page base class, together defining a backbone for integrating a hierarchy window, attribute window, and wizard page window;
linking said hierarchy window, said attribute window, and said wizard page window to a database and to each other such that chances made to a property page or sheet in one window are reflected in all the others and in said database, and that selecting a property page in one window acts to select that same page in the others; and
editing said hierarchy window or said attribute window to alter the wizard page window, said wizard page window hiding pages marked as skipped.

16. The method of claim 15, wherein said utilizing and linking are performed by a software developer.

17. The method of claim 16, wherein an Internet Service Provider utilizes said hierarchy window, said attribute window, and said wizard page window in entering data into and modifying said wizard for eventual use by an end user.

18. The method of claim 15, further including:
displaying a list of pages in the wizard in said hierarchy window along with each page's associated module in a hierarchical format; and
allowing a user to select any one of said pages in said hierarchy window.

19. The method of claim 18, further including:
displaying information regarding whether or not each page is marked as skipped and/or whether or not each page can be skipped in said hierarchy window.

20. The method of claim 15, further including displaying the name of one or more fields on a selected page and whether or not the one or more fields are marked as editable and/or displayable in said attribute window.

21. The method of claim 20, further including displaying the name of a module associated with said selected page, a dialog name of said selected page, and whether or not said selected page should be skipped in said attribute window.

22. The method of claim 15, further including checking if a selected page of the wizard is marked as "skipped" and if it is not, displaying said selected page of the wizard and providing for linear navigation in said wizard page window by providing a "prev" button which links said selected page to the last page before said selected page not marked as skipped, if any, and providing a "next" button which links said selected page to the first page after said selected page not marked as skipped, if any.

23. A program storage device readable by a machine, tangibly embodying a program of instructions executable by the machine to perform method steps for altering a wizard, the wizard created using a base class, the method steps comprising;
utilizing an alternative base class, said alternative base class derived from said base class and having functions for displaying a hierarchy window, an attribute window, and a wizard page window;

linking said hierarchy window, said attribute window, and said wizard page window to a database and to each other such that changes made to one window are reflected in all the others and in said database, and that selecting a particular wizard page in one window acts to select that same page in the others; and editing said hierarchy window or said attribute window to alter the wizard page window, said wizard page window hiding pages marked as skipped.

24. A program storage device readable by a machine, tangibly embodying a program of instructions executable by the machine to perform method for altering a wizard for communications-based software, the wizard created using one or more base classes, the method comprising:

utilizing one or more alternative base classes, said one or more alternative base classes derived from said one or more base classes and defining a backbone for integrating a hierarchy window, attribute window, and wizard page window;

linking said hierarchy window, said attribute window, and said wizard page window to a database and to each other such that changes made to one window are reflected in all the others and in said database, and that selecting a particular wizard page in one window acts to select that same page in the others; and editing said hierarchy window or said attribute window to alter the wizard page window, said wizard page window hiding pages marked as skipped.

25. A program storage device readable by a machine, tangibly embodying a program of instructions executable by the machine to perform method for altering a wizard, the wizard created using at least two base classes, a property sheet base class and a property page base class, and having a property sheet, said property sheet having one or more property pages, each property page representing a page in the wizard and having one or more fields, the method including;

utilizing an alternative property sheet base class, said alternative property sheet base class derived from said property sheet base class, and an alternative property page class, said alternative property page base class derived from said property page base class, together defining a backbone for integrating a hierarchy window, attribute window, and wizard page window;

linking said hierarchy window, said attribute window, and said wizard page window to a database and to each other such that chances made to a property page or sheet in one window are reflected in all the others and in said database, and that selecting a property page in one window acts to select that same page in the others; and editing said hierarchy window or said attribute window to alter the wizard page window, said wizard page window hiding pages marked as skipped.

26. A software program for altering a wizard, the wizard created using one or more base classes, including:

a database;

an editor coupled to said database;

one or more alternative base classes, said one or more alternative base classes derived from said one or more base classes and having a backbone component;

a hierarchy window component coupled to said backbone component;

an attribute window component coupled to said backbone component;

a wizard page window component coupled to said backbone component, said wizard page window component hiding pages marked as skipped; and said hierarchy window component, said attribute window component, and said wizard page window component coupled to said database and to each other.

27. The software program of claim 26, where said hierarchy window component includes a wizard page lister.

28. The software program of claim 27, wherein said hierarchy window component includes a wizard page selector.

29. The software program of claim 28, wherein said wizard page lister includes a skipped wizard page lister.

30. The software program of claim 26, wherein said attribute window component includes a field name lister, an editable field lister, and a displayable field lister.

31. The software program of claim 30, wherein said attribute window component includes a module name lister, a dialog name lister, and a skipped page lister.

32. The software program of claim 26, wherein said wizard page window component includes a linear navigation buttons component.

33. A software program for altering a wizard for communications-based software, the wizard created using one or more base classes, including:

a database:

an editor coupled to said database;

one or more alternative base classes, said one or more alternative base classes derived from said one or more base classes and having a backbone component;

a hierarchy window component coupled to said backbone component;

an attribute window component coupled to said backbone component;

a wizard page window component coupled to said backbone component, said wizard page window component hiding pages marked as skipped; and said hierarchy window component, said attribute window component, and said wizard page window component coupled to said database and to each other.

34. The software program of claim 33, where said hierarchy window component includes a wizard page lister.

35. The software program of claim 34, wherein said hierarchy window component includes a wizard page selector.

36. The software program of claim 33, wherein said wizard page lister includes a skipped wizard page lister.

37. The software program of claim 33, wherein said attribute window component includes a field name lister, an editable field lister, and a displayable field lister.

38. The software program of claim 37, wherein said attribute window component includes a module name lister, a dialog name lister, and a skipped page lister.

39. The software program of claim 33, wherein said wizard page window component includes a linear navigation buttons component.

40. A method for designing a wizard-altering program using an object-oriented language having one or more base classes from which all wizard-related components derived, including creating one or more alternative base classes, said one or more alternative base classes derived from the one or more base classes and containing a backbone for integrating a hierarchy window, an attribute window, a wizard page window, and a database;

creating functions for a hierarchy window, an attribute window, and a wizard page window, said hierarchy window, said attribute window, and said wizard page window linked to a database and to each other such that changes made to one window are reflected in all the others and in said database, and that selecting a particular wizard page in one window acts to select that same page in the others;

making all wizard-related components derive from one of said one or more alternative base classes; and making editing said hierarchy window or said attribute window alter the wizard page window, said wizard page window hiding pages marked as skipped.

41. A method for designing a wizard-altering program using C++ and Microsoft® Foundation Class, Microsoft® Foundation Class providing a CPpropertyPage class for defining individual pages of a wizard, the method including:

creating CBasePropPage, a class derived from CPropertyPage, and CFSPropSheet, a class derived from CPropertySheet, said CBasePropPage and CPSPropSheet together containing a backbone for integrating a hierarchy window, an attribute window, a wizard page window, and a database;

creating functions for a hierarchy window, an attribute window, and a wizard page window, said hierarchy window, said attribute window, and said wizard page window linked to a database and to each other such that changes made to one window are reflected in all the others and in said database, and that selecting a particular wizard page in one window acts to select that same page in the others;

making all wizard-related components derive from said CBasePropPaae or CFSPropSheet; and making editing said hierarchy window or said attribute window alter the wizard page window, said wizard page window hiding pages marked as skipped.

* * * * *

UNITED STATES PATENT AND TRADEMARK OFFICE
CERTIFICATE OF CORRECTION

PATENT NO.     : 6,564,375 B1                                                                    Page 1 of 1
DATED          : May 13, 2003
INVENTOR(S)    : Yansheng Jiang It is certified that error appears in the above-identified patent and that said Letters Patent is hereby corrected as shown below:

<u>Column 4,</u>
Line 61, replace "OninitDialog" with -- OnInitDialog --.

<u>Column 5,</u>
Line 28, after "252" insert -- . --.
Lines 50 and 51, replace "AddPageo( ),"  with -- AddPage( ), --.

<u>Column 7,</u>
Line 43, replace "DIgThlName" with -- DIgTblName --.

<u>Column 11,</u>
Line 23, replace "cleated" with -- created --.
Line 36, replace "pace" with -- page --.

<u>Column 12,</u>
Line 20, replace "chances" with -- changes --.

<u>Column 13,</u>
Line 49, replace "chances" with -- changes --.

<u>Column 14,</u>
Line 28, replace ":" with -- ; --.

<u>Column 16,</u>
Line 2, replace "CPSPropSheet" with -- CFSPropSheet --.
Line 14, replace "CBasePropPaae" with -- CBasePropPage --.

<p align="center">Signed and Sealed this

Sixteenth Day of September, 2003</p>

<p align="center">JAMES E. ROGAN
*Director of the United States Patent and Trademark Office*</p>